Dec. 5, 1967  H. E. TRACY  3,356,378

SEALING RING ASSEMBLY FOR A MECHANICAL SEAL

Filed April 26, 1965

HERBERT E. TRACY
INVENTOR.

BY John O. Evans, Jr.

ATTORNEY

United States Patent Office 3,356,378
Patented Dec. 5, 1967

3,356,378
SEALING RING ASSEMBLY FOR A
MECHANICAL SEAL
Herbert E. Tracy, Alhambra, Calif., assignor to Borg-Warner Corporation, Chicago, Ill., a corporation of Illinois
Filed Apr. 26, 1965, Ser. No. 450,589
3 Claims. (Cl. 277—136)

ABSTRACT OF THE DISCLOSURE

A mechanical seal assembly for sealing a rotary shaft to a housing having a shaft opening through which the shaft extends. The assembly as a rotary sealing ring and a cooperating fixed sealing ring. At least one sealing ring is mounted on a backing ring carried by the shaft or the housing and sealed to the backing ring by a lapped, fluid-tight, joint. A mounting ring engages peripheries of the backing ring and the sealing ring to prevent relative transverse movement of the rings, and key-and-keyway means prevents relative rotation of the rings. The rings are readily assembled and disassembled.

---

Figure 1:
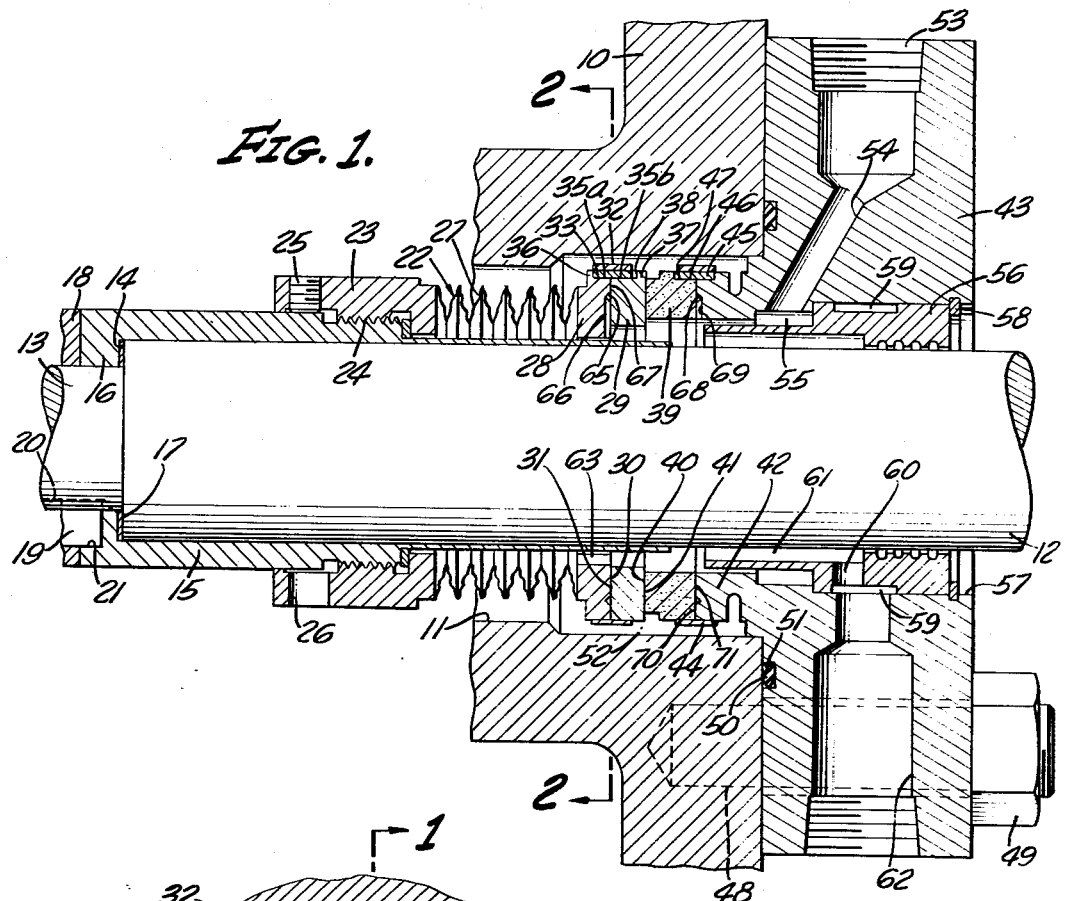

This invention relates to a sealing ring assembly for a mechanical seal. More particularly, the invention relates to a sealing ring assembly in which a sealing ring is mounted on and carried by a backing ring.

Mechanical seals are used to seal a rotary shaft to a housing through which the shaft extends. A mechanical seal includes a fixed sealing ring that is sealed to the housing and a complementary rotary ring that is sealed to the shaft. These sealing rings have abutting, lapped, sealing surfaces. One of the rings is movable longitudinally of the shaft and is pressed into sealing engagement with the other of the rings by a spring or other biasing means. The lapped sealing surfaces of the rings rotate relative to each other and effectively seal the rotating shaft against flow of fluid from the interior of the housing outwardly of the housing along the shaft. Due to pressure drop across the sealing faces, fluid flows at a low rate between them. This fluid lubricates the sealing surfaces.

In some known mechanical seals, either one of the sealing rings, or both of them, is mounted upon a backing ring. Various ways of sealing the sealing ring to the backing ring and physically attaching it to the backing ring have been proposed. These known devices for mounting the sealing ring upon the backing ring have not been entirely satisfactory. In certain arrangements, screw fasteners have been used to mount the sealing ring on the backing ring. The mounting procedure has been time-consuming and sometimes very difficult, if not impossible, to perform in the stuffing box of the shaft housing. Moreover, because the sealing ring and the backing ring may be of different materials, having different coefficients of expansion, the mounting means is subject to stresses when the assembly is subjected to changes in temperature.

Accordingly, it is an object of the present invention to provide a sealing ring assembly for mechanical seal wherein a sealing ring is mounted on a backing ring in a simple and foolproof manner.

Another object of the invention is to provide a sealing ring assembly that is easy to make and assemble, and that permits replacement of the sealing ring expeditiously.

Another object is to provide a mounting ring for a sealing ring assembly that allows the sealing ring to be quickly and securely attached to the backing ring.

Still another object of the invention is to provide a sealing ring assembly in which the sealing ring and the backing ring and even the mounting ring may have different thermal coefficients of expansion and yet the assembly will perform satisfactorily regardless of the operating temperature or changes in the operating temperature.

The foregoing, and other aims, objects and advantages of the invention are realized in a mechanical seal assembly for sealing a rotary shaft member to a housing member having a shaft opening through which the shaft member extends, the assembly including: a closed rotary sealing ring carried by and rotated by the shaft member; a closed fixed sealing ring carried by and fixed against rotation with respect to the housing member; the sealing rings having opposed, generally radially extending, annular, continuous, surfaces in a relatively rotatable, sealing engagement; resilient means for urging the sealing rings into the sealing engagement; a closed backing ring carried by and sealed to one of the members and fixed against rotation with respect to the one member; and the backing ring and one of the sealing rings having opposed, generally radially extending, annular, continuous sealing faces in a relatively stationary sealing engagement with each other, wherein the improvement includes: a closed mounting ring engaging peripheries of the backing ring and the one sealing ring for preventing the one sealing ring from moving transversely with respect to the backing ring; and key-and-keyway means for interlocking the backing ring, the mounting ring, and the one sealing ring against relative rotation while permitting the one sealing ring and the backing ring to be withdrawn from the mounting ring in the axial direction. The key-and-keyway means may include an elongated key affixed to the mounting ring and extending axially thereof, and the backing ring and the one sealing ring provide axially aligned keyway sections for receiving the key. Also, when such keyway sections are used, the backing ring and the one sealing ring may provide walls closing the distal ends of the keyway sections, and the key is shorter than the distance between the walls, whereby the sealing faces of the one sealing ring and of the backing ring may be seated firmly against each other.

Figure 2:
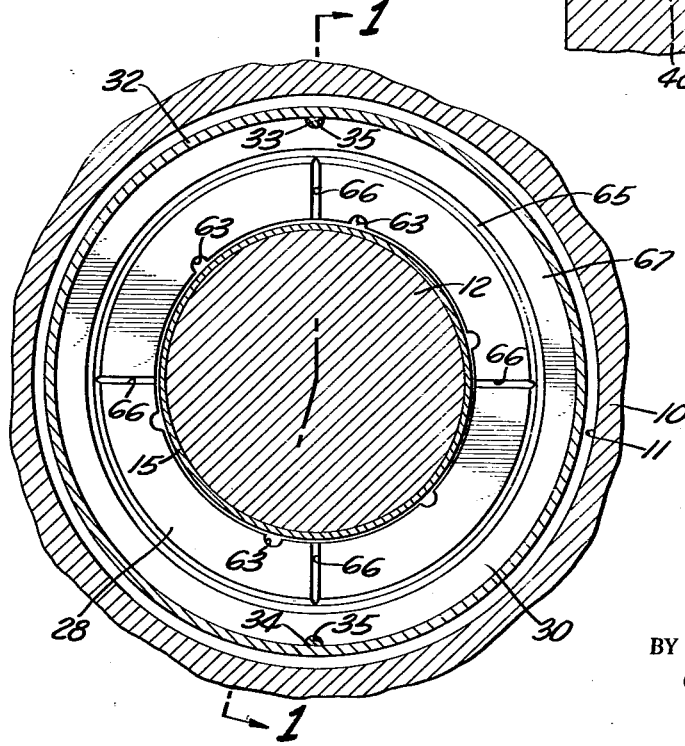

The invention will be described in greater detail with reference to the accompanying drawings in which:

FIG. 1 is a longitudinal sectional view of a mechanical seal device, including a form of sealing ring assembly in accordance with the invention, taken along the line 1—1 of FIG. 2 looking in the direction of the arrows; and FIG. 2 is an enlarged transverse sectional view taken on the line 2—2 of FIG. 1 looking in the direction of the arrows.

Referring to the drawings, there is shown a housing 10 having therethrough an opening 11. A shaft 12 extends through the opening. This shaft is rotatably mounted in bearings (not shown). The housing 10 may be a pump housing, for example, with the interior of the pump being to the left of the housing section shown in FIG. 1. The shaft may, for example, carry a rotary pump impeller (not shown) at its left-hand extension. The right-hand extension of the shaft may be connected to a driver (not shown), such as an electric motor. The shaft has a reduced portion 13 providing a shoulder 14. A shaft sleeve 15 is fitted to the shaft. The sleeve has a flange 16 opposed to the shoulder 14, and a gasket 17 is compressed between the shoulder and the flange. The sleeve is restrained from movement to the left with respect to the shaft by abutment with the impeller hub 18. The sleeve is locked to the shaft for rotation therewith by a key 19 received in both a keyway 20 in the shaft and a keyway 21 in the sleeve.

Mounted upon the shaft sleeve for rotation therewith is a bellows subassembly designated by the general reference numeral 22. This subassembly includes an adapter 23 threaded to the shaft sleeve at 24. The adapter is locked to the sleeve by a set screw 25. A hole 26 is provided in the adapter for the reception of a wrench or other tool to enable the bellows subassembly to be screwed on and off of the sleeve. A metallic bellows 27 is welded at one end to the adapter. The other end of the bellows has welded to it a flange 28 which serves as a backing ring.

This backing ring carries a rotary sealing ring 29. The abutting faces 30 of the backing ring and 31 of the sealing ring are lapped to a high polish and a high degree of flatness to provide a fluid-tight joint between these rings.

The rotary sealing ring 29 and its backing ring 28 are encircled by a mounting ring 32. The mounting ring is disposed closely about the outer peripheries of these rings with a tolerance sufficient to accommodate heat expansion of the parts. Thus, the mounting ring prevents relative lateral movement of the sealing ring with respect to the backing ring. One or more keys 33, 34 are welded or otherwise formed on the inner periphery of the mounting ring. These keys extend generally longitudinally or axially of the sealing rings. They are preferably straight in the axial direction, and also are preferably semicylindrical in cross section, as shown in FIG. 2. Each key is received in a keyway 35. This keyway 35 has a keyway section 35a in the backing ring 28 and a keyway section 35b in the rotary sealing ring 29. The ends of the keyway are closed by portions 36 and 37 of the backing ring and rotary seal ring, respectively. These ring portions prevent the key 33 from moving axially out of the keyway when the parts are assembled. It will be noted from FIG. 1 that the keyway is slightly longer than the key to provide a small clearance 38 between the ends of the key and the ends of the keyway. Thus, the rotary sealing ring 29 may be seated firmly against the backing ring 28 without contacting both ends of the key, whereby a tight joint is provided at the lapped faces 30 and 31. Because the mounting ring is welded to the keys, it cannot slip axially from the ring assembly.

From the foregoing description, it is seen that the shaft sleeve, the bellows subassembly, the mounting ring, and the rotary sealing ring rotate with the shaft 12.

Opposed to the rotary sealing ring 29, and in sealing engagement therewith, is a fixed sealing ring 39. The fixed sealing ring has a sealing surface 40 opposed to a sealing surface 41 on the rotary sealing ring 29. These sealing surfaces are lapped to a virtually flat, mirror finish. The fixed sealing ring is mounted on a ring-like portion 42 of the seal flange 43. The ring-like portion 42 forms, in effect, a stationary backing ring for the fixed sealing ring 39. The latter is mounted on the portion 42 by a mounting ring 44 similar to the mounting ring 32 hereinbefore described. This mounting ring 32 has one or more keys 45 similar to the keys 33 and 34, previously described. The key 45 is received in a keyway 46 analogous to the keyway 35. The keyway 46 has a keyway section in the fixed sealing ring 39 and an axially aligned keyway section in the ring-like portion 42. Clearance space 47 is provided between the key 45 and the end of the keyway 46 for the same purpose as the space 38 hereinbefore described.

The seal flange 43 is mounted to the housing 10 and secured to the latter by a bolt 48 having a nut 49. A gasket ring 50 fitted in an annular groove 51 seals the flange to the housing. In this way, the stuffing box space 52 surrounding the mechanical seal is effectively isolated from the exterior of the housing.

Provision is made for the flow of steam over the sealing rings and into the interior of the bellows to prevent the formation of deposits on these elements. To this end, a steam inlet 53 is provided in the seal flange 43. A bore 54 conducts steam from the inlet into an annular space 55 formed between a baffle sleeve 56 and the flange. The flange 43 has a bore 57 into which the baffle sleeve is fitted and in which the sleeve is retained by a snap ring 58. An annular steam outlet channel 59 connects through the bore 60 with the space 61 between the shaft 12 and the baffle sleeve. Steam is exhausted through the outlet bore 62.

Quench steam at a pressure of approximately 10 p.s.i. guage is introduced into the inlet 53. It flows through the bore 54 into the annular space 55 and, as seen in FIG. 1, to the left over the outside of the baffle sleeve 56. The steam is directed inside the sealing rings 39 and 29. It finds access to the interior of the bellows 27 through semicircular grooves 63 formed in the inner periphery of the bellows flange 28. Quench steam is exhausted through the space 61 between the baffle sleeve and the shaft. It flows from space 61 through the bore 50 and out of the outlet bore 62. Quench fluids other than steam may be used. However, steam is employed if the fluid being pumped is, for example, a hydrocarbon. In this case, hydrocarbon liquid that flows in small quantities from the inside of the housing to the outside between the abutting faces of the sealing rings 29 and 39 is subject to coking. The quench steam prevents or eliminates such undesirable coking adjacent to the interface of the sealing rings.

As best seen in FIG. 2, an annular groove 65 is formed in the face 30 of the backing ring 28. Radial channels 66 connect this annular groove with the space surrounding the shaft 12. By this means, the forces pressing the backing ring 28 and the sealing ring 29 together are concentrated largely in the annular area 67 of the backing ring 28. High unit pressures are thus achieved over this area resulting in more effective sealing of the backing ring to the rotary sealing ring.

A similar configuration of an annular groove 68 and radial channels 69 may be formed in the ring-like portion 42 that forms a backing ring for the stationary sealing ring 39. Unit pressures are thus increased in an annular, radially outer zone between the faces 70 and 71 of the fixed sealing ring and its backing ring.

Since the manner in which mechanical seals in general operate is well-known, it is not believed necessary to describe it in detail here. However, since the sealing rings 39 and 29 will wear in use and will need to be replaced, the replacement of these seals will now be described. To replace the sealing rings, the sealing flange 43 is removable by sliding to the right after the nut 49 is unscrewed. This flange with its fixed sealing ring 39 and mounting ring 44 may be removed from the shaft. Then, the fixed sealing ring 39 is easily withdrawn from the mounting ring 44 and replaced by a new sealing ring.

With the flange 43 removed, the rotary sealing ring 29 is easily grasped by a mechanic and removed through the housing opening 11. A new sealing ring is set in the mounting ring 32 and the flange, with its fixed mounting ring, is replaced over the shaft and bolted to the housing.

The sealing rings, backing rings, and mounting rings may be made of various materials, depending upon the type of service for which they are intended. For example, the backing rings and mounting rings may be made of stainless steel. The stationary sealing ring may be made of carbon. And the rotary sealing ring may be made of tungsten carbide, Stellite, or other hard material. These materials have different thermal coefficients of expansion.

From the foregoing description, it is evident that the sealing ring assembly of the invention can be constructed of members having different heat expansion characteristics and yet not leak at the joints because of temperature changes. It is also manifest that the sealing ring assembly of the invention satisfies the objects thereof.

It will be apparent that various modifications may be made in the exemplary embodiments shown and described herein without departing from the spirit and scope of the following claims.

I claim:

1. A mechanical seal assembly for sealing a rotary shaft member to a housing member having a shaft opening through which the shaft member extends, said assembly including:

(a) a closed, rotary sealing ring carried by and rotated by the shaft member;

(b) a closed, fixed sealing ring carried by and fixed against rotation with respect to the housing member;
(c) said sealing rings having opposed, generally radially extending, annular, continuous, sealing surfaces in relatively rotatable, sealing engagement;
(d) resilient means for urging said sealing rings into said sealing engagement;
(e) a closed backing ring carried by and sealed to one of the members and fixed against rotation with respect to the one member; and
(f) said backing ring and one of said sealing rings having opposed, generally radially extending, annular, continuous sealing faces in relatively stationary sealing engagement with each other, wherein the improvement comprises:
a closed mounting ring engaging peripheries of said backing ring and said one sealing ring for preventing said one sealing ring from moving transversely with respect to said backing ring; and key-and-keyway means for interlocking said backing ring, said mounting ring, and said one sealing ring against relative rotation while permitting said one sealing ring and said backing ring to be withdrawn from said mounting ring in the axial direction, said key-and-keyway means comprising an elongated key affixed to said mounting ring and extending axially thereof, and said backing ring and said one sealing ring provide axially aligned keyway sections for receiving said key.

2. A mechanical seal assembly as defined in claim 1 wherein said key is straight.

3. A mechanical seal assembly as defined in claim 1 wherein said backing ring and said one sealing ring provide walls closing the distal ends of said keyway sections, and said key is shorter than the distance between said walls, whereby the sealing faces of said one sealing ring and of said backing ring may be seated firmly against each other, and said one sealing ring and said backing ring are constrained to be withdrawn from said mounting ring in opposite axial directions.

References Cited

UNITED STATES PATENTS

| 1,280,493 | 10/1918 | Kurtz | 277—198 |
| 2,432,684 | 12/1947 | Roshong | 277—88 X |
| 2,886,352 | 5/1959 | Krellner. | |
| 3,190,661 | 6/1965 | Wahl et al. | 277—136 X |
| 3,288,474 | 11/1966 | Gits | 277—88 |

FOREIGN PATENTS

| 448,430 | 5/1948 | Canada. |

SAMUEL ROTHBERG, *Primary Examiner.*

J. S. MEDNICK, *Assistant Examiner.*